(12) United States Patent
Erchak et al.

(10) Patent No.: US 8,092,064 B2
(45) Date of Patent: Jan. 10, 2012

(54) TILED ILLUMINATION ASSEMBLY AND RELATED METHODS

(75) Inventors: Alexei A. Erchak, Cambridge, MA (US); Robert F. Karlicek, Chelmsford, MA (US); David Doyle, Somerville, MA (US); Gianni Taraschi, Somerville, MA (US); Michael A. Joffe, Harvard, MA (US); Christian Hoepfner, North Andover, MA (US)

(73) Assignee: Rambus International Ltd., Grand Cayman (KY)

( * ) Notice: Subject to any disclaimer, the term of this patent is extended or adjusted under 35 U.S.C. 154(b) by 0 days.

(21) Appl. No.: 11/757,734

(22) Filed: Jun. 4, 2007

(65) Prior Publication Data

US 2008/0205080 A1    Aug. 28, 2008

Related U.S. Application Data

(60) Provisional application No. 60/903,184, filed on Feb. 3, 2007.

(51) Int. Cl.
*F21V 7/04*    (2006.01)

(52) U.S. Cl. ........ 362/613; 362/223; 362/224; 362/225; 362/607; 362/612; 362/615; 362/97.1; 362/97.2; 349/65

(58) Field of Classification Search .............. 362/27, 362/223, 224, 260, 225, 603, 606, 607, 612, 362/613, 615, 621, 800, 616, 97.1, 97.2; 349/65
See application file for complete search history.

(56) References Cited

U.S. PATENT DOCUMENTS

| | | | |
|---|---|---|---|
| 4,714,983 A | 12/1987 | Lang | |
| 5,105,183 A * | 4/1992 | Beckman | 345/1.3 |
| 6,241,358 B1 * | 6/2001 | Higuchi et al. | 362/613 |
| 6,292,157 B1 * | 9/2001 | Greene et al. | 345/1.3 |
| 6,580,477 B1 * | 6/2003 | Cho | 349/65 |
| 6,831,302 B2 | 12/2004 | Erchak et al. | |
| 6,979,112 B2 * | 12/2005 | Yu et al. | 362/600 |
| 7,180,252 B2 | 2/2007 | Lys et al. | |
| 7,311,431 B2 | 12/2007 | Chew et al. | |
| 7,358,929 B2 | 4/2008 | Mueller et al. | |
| 7,458,709 B2 * | 12/2008 | Lang et al. | 362/612 |
| 2003/0206253 A1 * | 11/2003 | Cho | 349/61 |
| 2004/0165372 A1 * | 8/2004 | Parker | 362/31 |
| 2005/0040424 A1 | 2/2005 | Erchak et al. | |
| 2005/0116667 A1 * | 6/2005 | Mueller et al. | 315/312 |
| 2006/0245213 A1 * | 11/2006 | Beil et al. | 362/616 |
| 2006/0262521 A1 | 11/2006 | Piepgras et al. | |
| 2007/0045640 A1 | 3/2007 | Erchak et al. | |
| 2007/0211183 A1 | 9/2007 | Erchak et al. | |
| 2008/0205078 A1 | 8/2008 | Erchak et al. | |

FOREIGN PATENT DOCUMENTS

WO    WO 2005114273 A1 *  12/2005
* cited by examiner

*Primary Examiner* — Diane Lee
*Assistant Examiner* — Mary Zettl
(74) *Attorney, Agent, or Firm* — Renner, Otto, Boisselle & Sklar, LLP

(57) ABSTRACT

Illumination assemblies, components, and related methods are described. An illumination assembly is provided that comprises a plurality of illumination tiles each having a light emission surface. The plurality of illumination tiles are arranged in a two-dimensional array. The illumination tiles are constructed and arranged so as to provide a substantially contiguous illumination surface comprising the light emission surfaces of the plurality of the illumination tiles. Each illumination tile is illuminated by at least one solid state light-emitting device. A method of local dimming an illumination assembly of a display (e.g., LCD) backlight unit is also provided.

22 Claims, 10 Drawing Sheets

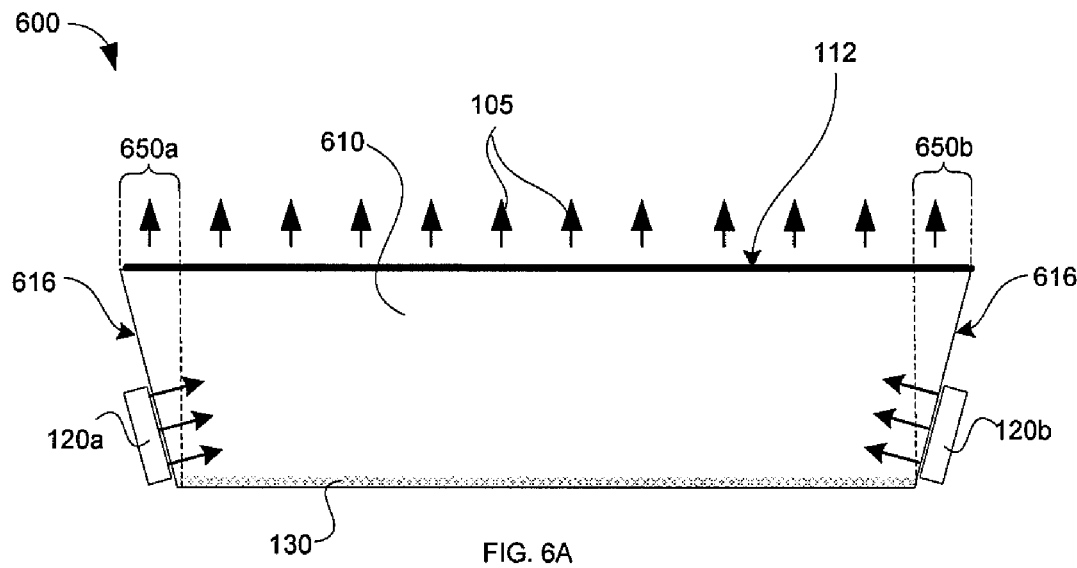
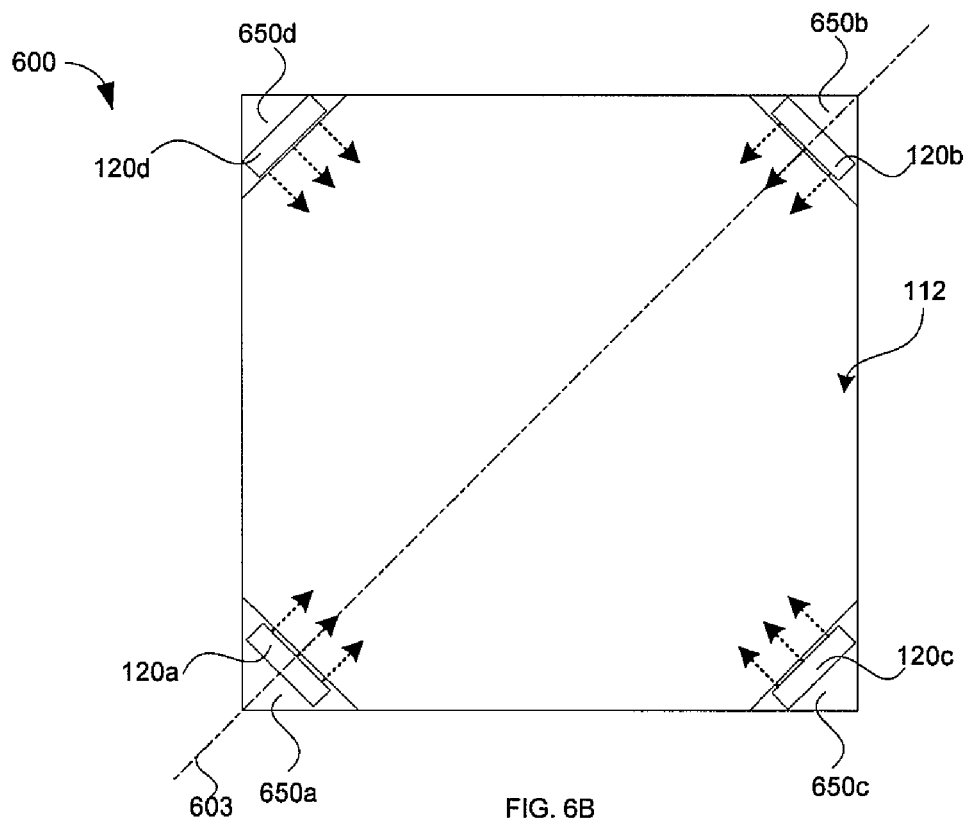

TILED ILLUMINATION ASSEMBLY AND RELATED METHODS

RELATED APPLICATIONS

This application claims priority under 35 U.S.C. §119(e) to U.S. Provisional Application Ser. No. 60/903,184, filed on Feb. 23, 2007, which is herein incorporated by reference in its entirety.

FIELD

The present embodiments are drawn generally towards illumination systems, and more specifically, illumination systems including solid state light-emitting devices.

BACKGROUND

Illumination assemblies can provide light for a variety of applications, including general lighting and electronic applications. For example, a backlighting assembly can be used to provide light for a display, for example a liquid crystal display (LCD). Currently such backlighting assemblies mainly employ cold cathode fluorescent tubes (CCFLs) as light sources. Although fluorescent tubes can provide efficient distributed lighting for illumination assemblies, serious disadvantages include complicated inverter electronics, slow switching speeds, and the presence of hazardous materials within the fluorescent tubes.

SUMMARY

Illumination systems, components, and methods associated therewith are provided.

In one aspect, an illumination assembly comprises a plurality of illumination tiles each having a light emission surface, wherein the plurality of illumination tiles are arranged in a two-dimensional array, the illumination tiles being constructed and arranged so as to provide a substantially contiguous illumination surface comprising the light emission surfaces of the plurality of the illumination tiles. The illumination assembly includes a plurality of solid state light-emitting devices, wherein each illumination tile is illuminated by at least one of the solid state light-emitting devices.

In one aspect, an illumination assembly comprises a plurality of illumination tiles each having a light emission surface, wherein the plurality of illumination tiles are arranged in a two-dimensional array, the illumination tiles being constructed and arranged so as to provide an illumination surface comprising the light emission surfaces of the plurality of the illumination tiles. The illumination assembly includes a plurality of solid state light-emitting devices, wherein each illumination tile is illuminated by at least one of the solid state light-emitting devices. The output light intensity varies by less than 50% across the illumination surface.

In one aspect, a method of local dimming of a display backlight unit for a plurality of pixel light valves is provided. The method comprises providing the display backlight unit comprising a plurality of illumination tiles each having a light emission surface, wherein the plurality of illumination tiles are arranged in a two-dimensional array, the display backlight unit further comprising a plurality of solid state light-emitting devices, wherein each illumination tile is illuminated by at least one of the solid state light emitting device. The method further comprises, for each illumination tile of the plurality of illumination tiles, determining a highest desired brightness for light to be outputted by the pixel light valves illuminated by the illumination tile. The method also comprises controlling light emission from the one or more light-emitting devices such that light output from the light emission surface of the illumination tile provides a light input to a pixel light valve set to a desired level of transmission such that the light outputted by the pixel light valve has the highest desired brightness.

In one aspect, a method of forming an illumination assembly is provided. The method comprises providing a plurality of illumination tiles each having a light emission surface, wherein the plurality of illumination tiles are arranged in a two-dimensional array, the illumination tiles being constructed and arranged so as to provide a substantially contiguous illumination surface comprising the light emission surfaces of the plurality of the illumination tiles. The method also comprises providing a plurality of solid state light-emitting devices, wherein each illumination tile is illuminated by at least one of the solid state light-emitting devices.

Other aspects, embodiments and features of the invention will become apparent from the following detailed description of the invention when considered in conjunction with the accompanying figures. The accompanying figures are schematic and are not intended to be drawn to scale. Each identical or substantially similar component that is illustrated in various figures is represented by a single numeral or notation.

For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF FIGURES

FIGS. 6A-B are cross-section and top views of an illumination tile, in accordance with one embodiment;

DETAILED DESCRIPTION

Some embodiments presented herein include illumination assemblies comprising a plurality of illumination tiles each having a light emission surface. The illumination tiles can be arranged in a two-dimensional array and each illumination tile can be illuminated by one or more solid state light-emitting devices. The illumination tiles may be constructed such that they can provide a substantially contiguous illumination surface comprising the light emission surface of each illumination tile. In some embodiments, the illumination assembly can serve as a display backlight unit, for example, an LCD backlight unit.

A two-dimensional arrangement of illumination tiles allows for the creation of large illumination assemblies having a contiguous illumination surface. In particular, tiles may be placed adjacent each other in two dimensions allowing for the creation of illumination assemblies that provide illumination over any desired area having any desired length in two dimensions. Furthermore, since each tile may be illuminated by separate solid state light-emitting devices, such an assembly can readily enable local dimming, whereby the brightness of the light emitted by each tile can be individually controlled. Local dimming can be especially beneficial in backlight units for display applications and can allow for significant power savings (e.g., greater than 25%).

Figure 1A:
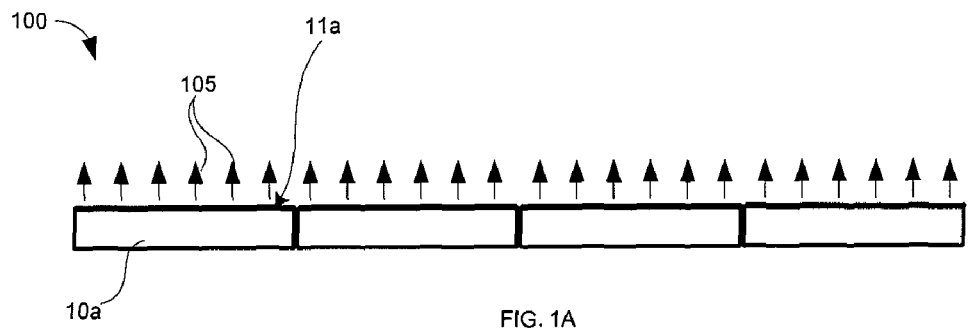
FIGS. 1A-B are cross-section and top views of a tiled illumination assembly, in accordance with one embodiment.
Figure 1B:
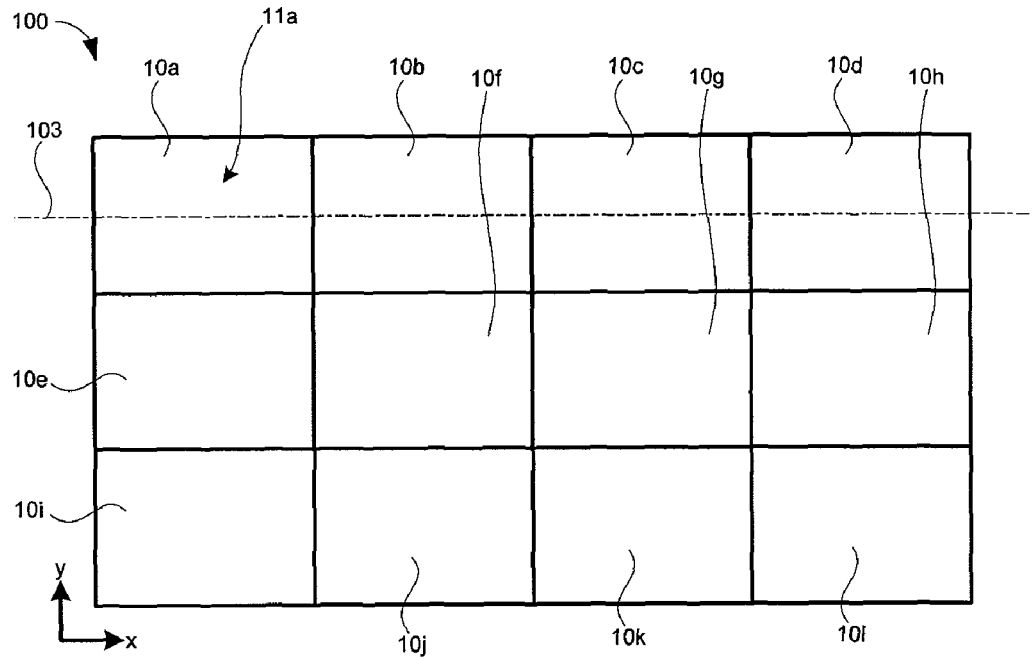

FIGS. 1A-B are cross-section and top views of a tiled illumination assembly 100, in accordance with one embodiment. The view of FIG. 1A is a cross-section along line 103 of FIG. 1B. The illumination assembly 100 may serve as part of a display backlight unit (e.g., an LCD backlight unit).

The illumination assembly 100 can include a plurality of illumination tiles 10a-l each having a light emission surface (e.g., surface 11a of tile 10a) via which light 105 is emitted. The illumination tiles can be arranged in a two-dimensional array defined by a first axis (x) and a second axis (y). At least two illumination tiles (e.g., 10a, 10b, 10c, 10d) may be aligned along the first axis (x) and at least two illumination tiles (e.g., 10a, 10e, 10i) may be aligned along the second axis (y). In some embodiments, the two-dimensional array includes a two-dimensional rectangular arrangement, where the first axis is orthogonal to the second axis. However, it should be appreciated that non-rectilinear arrangements are possible. In some embodiments, the first axis and the second axis may be non-orthogonal. In some embodiments, a two-dimensional tiled arrangement of triangular and/or hexagonal tiles may form an illumination assembly. In some embodiments, a two-dimensional tiled arrangement of parallelogram tiles may form an illumination assembly.

The illumination assembly 100 can be used to provide lighting for a display (e.g., LCD) and/or a general lighting assembly. For an LCD, a liquid crystal layer including liquid crystal light valves (corresponding to the pixels of the display) may be disposed over the illumination assembly 100 such that light 105 can impinge on the liquid crystal layer. In some embodiments, the liquid crystal layer may be a single continuous layer and may be illuminated by the illumination assembly 100. For a general lighting assembly, the illumination assembly 100 can be used as is or may have other layers disposed over the illumination surface of the assembly, for example one or more layers may be located over the assembly 100 so as to alter the lightening character. For example, a diffusing layer or a textured layer may be placed over the assembly 100.

The illumination tiles 10 can include one or more light-emitting devices and one or more elements that distribute and emit light (e.g., substantially uniformly across an emission surface) provided by the one or more light-emitting devices. For example, the illumination tiles 10 can include light guides that guide light emitted by one or more light-emitting devices. For example the light guides can be formed of a transparent plastic (e.g., PMMA, acrylic) and/or glass.

The light emission surface area of an illumination tile may be greater than about 0.01 $m^2$ (e.g., greater than or equal to about 0.05 $m^2$, greater than or equal to about 0.1 $m^2$, greater than or equal to about 0.16 $m^2$, greater than or equal to about 0.5 $m^2$, greater than or equal to about 1 $m^2$). In some embodiments, the emission surface area of an illumination tile ranges between about 0.01 $m^2$ and about 0.05 $m^2$, between about 0.05 $m^2$ and about 0.1 $m^2$, between about 0.1 $m^2$ and about 0.5 $m^2$, or between about 0.5 $m^2$ and about 1 $m^2$.

It should be appreciated that not all the illumination tiles of an illumination assembly need be the same. In some embodiments, an illumination assembly may comprise tiles having different dimensions. In some embodiments, an illumination assembly may include tiles having different shapes (e.g., rectangles, parallelograms, triangles, hexagons, etc.).

The illumination tiles 10 may be constructed and arranged so as to provide a substantially contiguous illumination surface comprising the light emission surfaces 11 of the plurality of the illumination tiles 10. As used herein, a "substantially contiguous" illumination surface does not include feature(s) between adjacent illumination tiles (e.g., which may adjoin or otherwise provide support for illumination tiles) that have a non-negligible effect on the illumination properties of the illumination surface. In some embodiments, the illumination surface is completely free of any feature between adjacent illumination tiles. Each illumination tile may be illuminated by one or more solid state light-emitting devices (not shown), such as light-emitting diodes and/or laser diodes. In some embodiments, each light-emitting device is arranged to illuminate only a single illumination tile. For example, to guarantee optical isolation between illumination tiles, the edges of the illumination tiles (e.g., edges between adjacent tiles) may be reflective (e.g., may have a mirror formed on the edges, such as a coating of reflective metal, for example aluminum and/or silver). This can allow for the light emission from each tile to be individually controlled since light from each light-emitting device associated with a given tile does not contribute to the light emission of neighboring tiles.

In some embodiments, a single light-emitting device illuminates a single illumination tile 10 which emits light via emission surface 11. A single high-power light-emitting device can be used to provide light to a single illumination tile. The high-power light-emitting device can include a large-area light-emitting diode (LED) (or laser diode) and/or a plurality or light-emitting diodes (or laser diodes) which may be packaged in a common package (e.g., in an array configuration).

In some embodiments, an illumination assembly (or each illumination tile of the assembly) may include a thermal management system that can dissipate heat produced by the light-emitting devices. In some embodiments, the thermal management system may be located on the backside of the illumination assembly (e.g., the side opposite the light emission surfaces 11). Such a feature may be desirable when the light-emitting devices are high-power light-emitting devices that generate significant amounts of heat, as may be the case when few light-emitting devices are used to illuminate each tile. Examples of thermal management systems for display and illumination systems are provided in U.S. patent application Ser. No. 11/413,968, entitled "LCD Thermal Management Methods and Systems," filed on Apr. 28, 2006, which is herein incorporated by reference in its entirety. Generally, a thermal management system may include a suitable system that can conduct and dissipate heat which may be generated by devices and components of the illumination assembly. In some embodiments, a thermal management system may be characterized by, or may include one or more components that are characterized by, a thermal conductivity greater than 5,000 W/mK, greater than 10,000 W/mK, and/or greater than 20,000 W/mK. In some embodiments, the thermal conductivity lies in a range between 10,000 W/mK and 50,000 W/mK (e.g., between 10,000 W/mK and 20,000 W/mK, between 20,000 W/mK and 30,000 W/mK, between 30,000 W/mK and 40,000 W/mK, between 40,000 W/mK and 50,000 W/mK).

In some embodiments, a thermal management system can include passive and/or active heat exchanging mechanisms. Passive thermal management systems can include structures formed of one or more materials that rapidly conduct heat as a result of temperature differences in the structure. Thermal management systems may also include one or more protrusions which can increase the surface contact area with the surrounding ambient and therefore facilitate heat exchange with the ambient. In some embodiments, a protrusion may include a fin structure that may have a large surface area. In a further embodiment, a thermal management system can include channels in which fluid (e.g., liquid and/or gas) may flow so as to aid in heat extraction and transmission. For example, the thermal management system may comprise one or more heat pipes to facilitate heat removal. Various heat pipes are well known to those in the art, and it should be understood that the embodiments presented herein are not limited to merely to such examples of heat pipes. Heat pipes can be designed to have any suitable shape, and are not necessarily limited to only cylindrical shapes. Other heat pipe shapes may include rectangular shapes which may have any desired dimensions. In some embodiments, one or more heat pipes may be arranged such that a first end of the heat pipes is located in regions of the illumination assembly that are exposed to high temperatures, such as in proximity to one or more light-emitting devices. A second end of the heat pipes (i.e., a cooling end) may be exposed to the ambient. The heat pipes may be in thermal contact with protrusions to aid in heat exchange with the ambient by providing increased surface area. Since heat pipes may have a thermal conductivity that is many times greater (e.g., 5 times greater, 10 times greater) than the thermal conductivity of many metals (e.g., copper), the conduction of heat may be improved via the incorporation of the heat pipes into illumination systems.

Active thermal management systems may include one or more suitable means that can further aid in the extraction and transmission of heat. Such active thermal management systems can include mechanical, electrical, chemical and/or any other suitable means to facilitate the exchange of heat. In one embodiment, an active thermal management system may include a fan used to circulate air and therefore provide cooling. In another embodiment, a pump may be used to circulate a fluid (e.g., liquid, gas) within channels in the thermal management system. In further embodiments, the thermal management system may include a thermal electric cooler that may further facilitate heat extraction.

In some embodiments, each illumination tile of an illumination assembly may be illuminated by light-emitting devices emitting light having different spectra (e.g., different dominant and/or peak wavelengths). For example, each tile may be illuminated by red, green, and blue light-emitting devices. Alternatively, or additionally, each tile can be illuminated by a white light-emitting device. A white light-emitting device may include a blue and/or UV light-emitting device with a wavelength conversion material (e.g., phosphor and/or quantum dots). Alternatively, or additionally, wavelength conversion material may be placed remotely from the light-emitting device, for example on and/or within the illumination tiles.

As discussed further below in relation to various embodiments of the illumination tiles, the tiles may be edge-lit by one or more light-emitting devices. Alternatively, or additionally, the illumination tiles may be back-lit by one or more light-emitting devices. In some embodiments, the number of light-emitting devices per unit area of the contiguous illumination surface is less than or equal to about 300 per m$^2$ (e.g., less than or equal to about 200 per m$^2$, less than or equal to about 100 per m$^2$, less than or equal to about 50 per m$^2$, less than or equal to about 25 per m$^2$, less than or equal to about 12 per m$^2$). For example, the number of light-emitting devices per m$^2$ of the contiguous illumination surface of an illumination assembly may be between 5 to 100, between 25 to 100, or between 50 to 100. A small number of light-emitting devices per unit area can be enabled by the use of high-power light-emitting devices which can be designed to emit a substantial amount of their generated light via a large die surface area, as discussed further below.

The number of light-emitting devices per illumination tiles may be less than or equal to 12 (e.g., less than or equal to about 8, less than or equal to about 6, less than or equal to about 4, less than or equal to about 2). In some embodiments, a single light-emitting device may illuminate an entire illumination tile.

The total number of light-emitting devices for certain illumination areas has been provided above. For numbering purposes, each of the following may count as one light-emitting device: a light-emitting die, two or more associated light-emitting dies, a partially packaged light-emitting die or dies, or a fully packaged light-emitting die or dies. For example, one light-emitting device may include a red light-emitting die associated with a green light-emitting die and associated with a blue light-emitting die.

In some embodiments, a light-emitting device is a light-emitting device that emits light of a single color. For example, the light-emitting device may be a red, green, blue, yellow, and/or cyan light-emitting device. In other embodiments, the light-emitting device is a multi-colored light-emitting device that emits light having a spectrum of wavelengths. For example, the light-emitting device may be a red-green-blue light-emitting device. In other embodiments, the light-emitting device may be a red-green-blue-yellow light-emitting device. In yet other embodiments, the light-emitting device may be a red-green-blue-cyan light-emitting device. In yet other embodiments, the light-emitting device is a red-green-blue-cyan-yellow light-emitting device. Illumination assemblies can also include combinations of light-emitting device types such as the ones described above. Of course, light-emitting devices of different colors can also be used in embodiments.

In some embodiments, the light intensity across the light emission surface of each illumination tile may be substantially uniform. For example, each illumination tile can include a light guide which may include light scattering features along (e.g., on one or more surfaces and/or within the bulk) the length of the guide. The light scattering features may be designed to scatter light traveling along the length of the guide into other directions, for example, a substantial portion of light may be scattered out via the light emission surface. Scattering features may include various types of features known to those in the art, for example micro-prisms, lens, refractive index variations, etc. The number of scattering features per unit area or volume may vary along the length of the guide, and may be more concentrated further away from the region of the guide where light from the light-emitting device is optically coupled. Since the intensity of light traveling within the light guide decreases with distance away from the region where light is coupled into the guide, the number of scattering features per unit area (or volume) along the length of the light guide can be chosen to compensate for the guided light intensity variation along the guide and thus provide for substantially uniform light emission across the light emission surface of the light guide.

Illumination tiles can be assembled in a variety of ways. In some embodiments, a support structure may serve as a backside support for the illumination tiles. The support structure may include a tray which is constructed to hold a desired number of illumination tiles in a desired arrangement (e.g., an N×M array, wherein N and M are any desired integers). For example a metal tray, such as an aluminum tray may serve as a support structure. The support structure may also serve as a backside reflective layer for the illumination tiles and/or part of all of a thermal management system. In some embodiments, a transparent layer (e.g., polymer and/or glass layer) may be placed over the emission surfaces of the illumination tiles so as to keep the tiles in place. Edges of the transparent layer may be secured to a frame of the support structure that holds the illumination tiles.

Figure 1C:
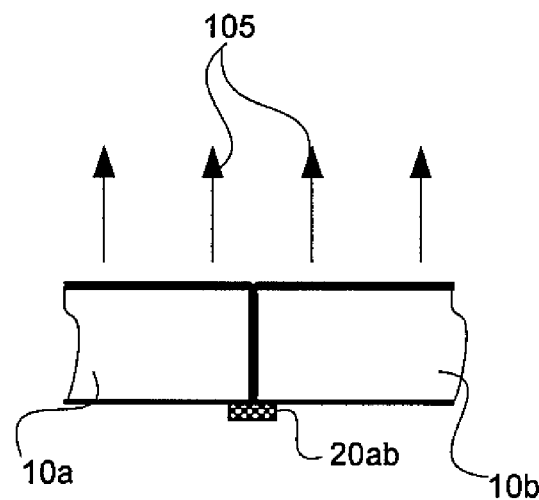
FIGS. 1C-D are cross-section and top views of a tiled illumination assembly, in accordance with one embodiment.
Figure 1D:
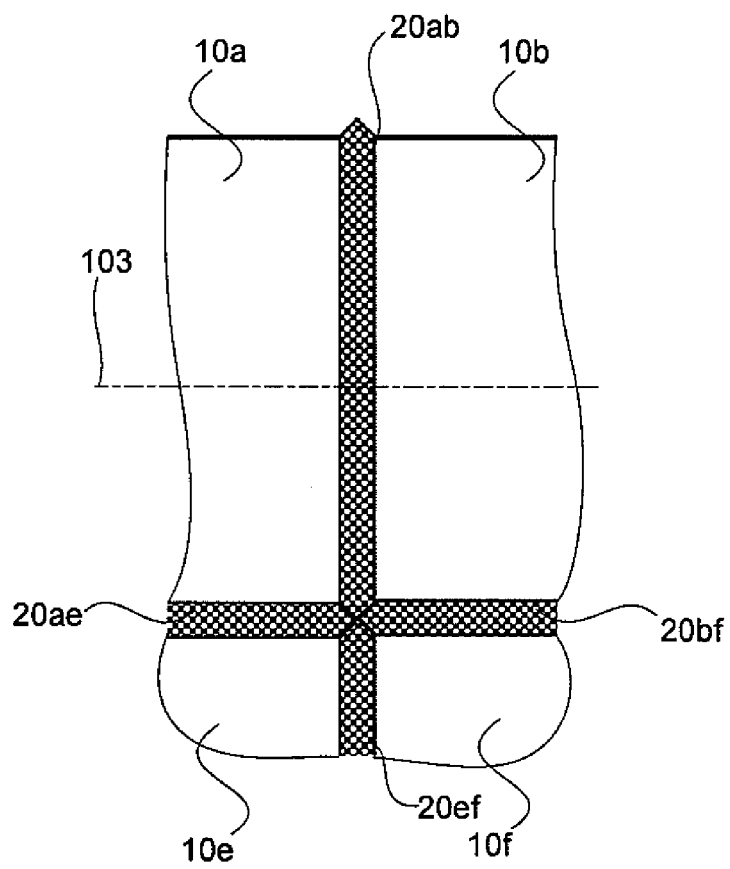

In some embodiments, the illumination assembly may be assembled using alignment members configured to align the plurality of illumination tiles. FIGS. 1C and 1D show side and bottom views of such an assembly including alignment members 20 (e.g., 20ab, 20ae, 20ef, 20bf). In the illustrated assembly of FIGS. 1C and 1D, alignment member 20ab provides for alignment between illumination tiles 10a and 10b, alignment member 20ae provides for alignment between illumination tiles 10a and 10e, alignment member 20ef provides for alignment between illumination tiles 10e and 10f, and alignment member 20bf provides for alignment between illumination tiles 10b and 10f. The alignment members can be designed to facilitate the formation of a "substantially contiguous" illumination surface for the assembly of tiles.

The alignment members can comprise an optical component (e.g., transparent, opaque, and/or translucent) with sufficient mechanical strength to mechanically align (e.g., make co-planar) individual illumination tiles. For example, the optical component may be formed of a transparent polymer, such as PMMA or acrylic, glass, or any other suitable material(s). The alignment members may be patterned with optical elements (e.g., reflectors, patterned lens features, patterned lens absorbers) to absorb, scatter, and/or reflect any light that does exit the tile array at a seam in a manner that makes the seam unperceivable to an observer. In some embodiments, the alignment members can prevent light from one tile from coupling into an adjacent tile. For example, the alignment members can include a reflective layer to prevent light from one tile from entering into an adjacent tile.

In the case of an illumination tile comprising an edge-lit rectangular light guide, the alignment member can be made to confine the light guides in a co-planar geometry. The alignment member can be patterned to scatter excess light leaking at the seam to reduce the appearance in the tiled illumination assembly. Also, the pattern does not need to be uniform along the entire alignment member, but can vary in density along the seam to correct for scattered light that may be more intense near the edge containing an illumination source.

In some embodiments, the light intensity varies by less than 50% across the entire illumination surface including the interface between adjacent tiles. In some embodiments, the light intensity across the entire illumination surface varies by much less, for example, less than 25%, less than 10%, or less than 5%. In some embodiments, the light intensity is substantially uniform across the entire illumination surface. In some cases, an observer would not perceive any significant variation in the light intensity across the entire illumination surface.

Various embodiments of illumination tiles can be used for form a two-dimensional tiled illumination assembly. Examples of various embodiments of illumination tiles that enable two-dimensional tiling are presented below.

Figure 2A:
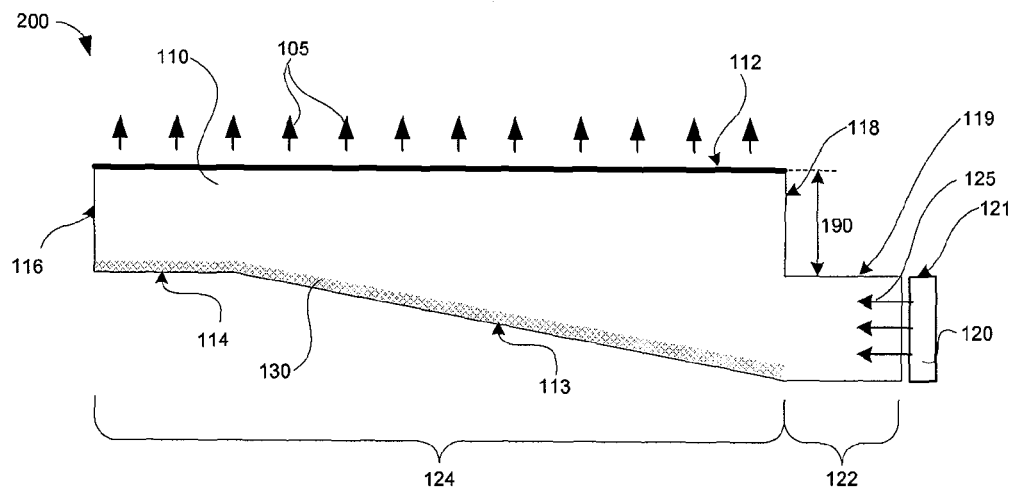
FIGS. 2A-B are cross-section and bottom views of an illumination tile, in accordance with one embodiment.
Figure 2B:
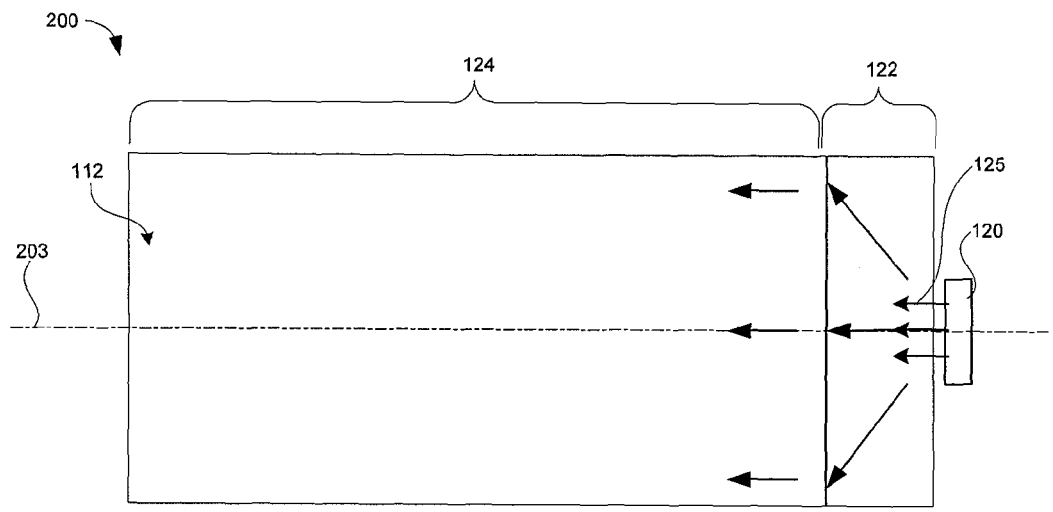

FIGS. 2A-B are cross-section and top views of an illumination tile, in accordance with one embodiment. The view of FIG. 2A is a cross-section along line 203 of FIG. 2B.

Illumination tile 200 can include one or more light-emitting devices 120 that serve as an illumination source for light guide 110. Light guide 110 may be formed of a transparent polymer (e.g., PMMA, acrylic) or glass, or any other suitable material(s). In some embodiments, the light guide may be formed via molding, for example injection molding. In some embodiments, the light guide can be formed of a one or more layers or portions attached to each other.

Light guide 110 can receive light 125 emitted from light-emitting device 120 via an edge, as illustrated in FIG. 2. Light guide 110 can include a light extraction portion 124 having top surface 112 that can emit light 105, thereby serving as a light emission surface. Light guide 110 can include a light input portion 122 including an edge that receives light from the light-emitting device 120 and a top surface 119 offset vertically from the top emission surface 112 of the light extraction portion 124. The vertical offset is the maximum vertical distance 190 between the top surface 119 of the light input portion 122 and the top emission surface 112 of the light extraction portion 124. In some embodiments, the vertical offset distance is greater than about 0.1 cm (e.g., greater than about 0.2 cm, greater than about 0.5 cm, greater than about 1 cm, greater than 2 cm). In some embodiments, the vertical offset distance is between about 0.1 cm and about 0.2 cm, between about 0.2 cm and about 0.5 cm, between about 0.5 cm and about 1 cm, or between about 1 cm and about 2 cm, or between about 0.1 cm and 2 cm. The vertical offset can allow a plurality of such light guides to be arranged in a co-planar two-dimensional array configuration thereby forming a contiguous illumination surface.

In some embodiments, the facilitation of the formation of a co-planar two-dimensional array having a contiguous illumination surface can be achieved by constructing an illumination tile such that a first end of the tile (e.g., the leftmost end of the tile 200) has a boundary surface that can fit into the boundary surface defined by a second end of the tile (e.g., the rightmost end of the tile 200). For example, with regards to illumination tile 200, the leftmost portion of the light guide 110 defined by edge 116 and backside surface portion 114 can fit into the boundary surface defined by light guide edges 118, 119, and top edge 121 of light-emitting device 120 (and any gap space between device 120 and light guide 110).

As illustrated in FIG. 2A, a surface 113 of the backside surface of the light guide may be oriented non-parallel to top emission surface 112, and another surface 114 of the backside surface of the light guide may be orientated parallel to the top emission surface 112. In other embodiments, surfaces 113 and 114 can both be non-parallel to the top emission surface 112.

Light guide 110 may serve to conduct light along its length using total internal reflection and/or reflection off of reflective regions. For example, in some embodiments, a backside mirror may be disposed underneath (e.g., under surfaces 113 and 114) the light guide 110. In some embodiments, the backside mirror may be directly in contact with the backside of light guide 110.

In some embodiments, light input portion 122 may also serve as a light homogenization region. To achieve homogenization, the light input portion 122 may have a sufficiently long length so as to allow light received from the light-emitting device 120 to spread uniformly laterally, as illustrated in FIG. 2B. The spatially homogenized light may be coupled into light extraction portion 124.

Extraction portion 124 can include light scattering and/or reflecting features 130, which can scatter at least some of the light impinging on them out via the top emission surface 112. Scattering and/or reflecting features may be disposed on a bottom surface of the light guide (as shown), on a top surface of the light guide (e.g., top emission surface 112), and/or within the light guide. The number of scattering and/or reflecting features 130 may vary along the length of the light guide so as to ensure that light emission via the top emission surface 112 is substantially uniform along the length of the light guide. In some embodiments, the intensity variation of light emitted along the length of the light guide is less than about 20% (e.g., less than about 15%, less than about 10%, less than about 5%).

Figure 3A:
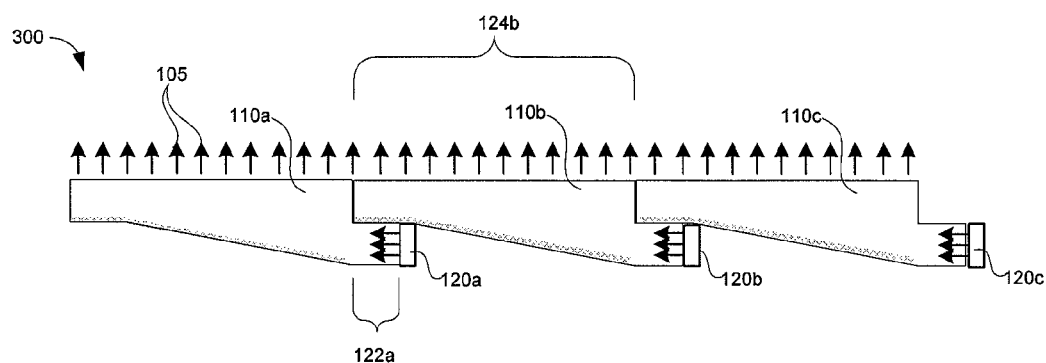
FIGS. 3A-B are cross-section and top views of an illumination assembly including tiles shown in FIGS. 2A-B, in accordance with one embodiment.
Figure 3B:
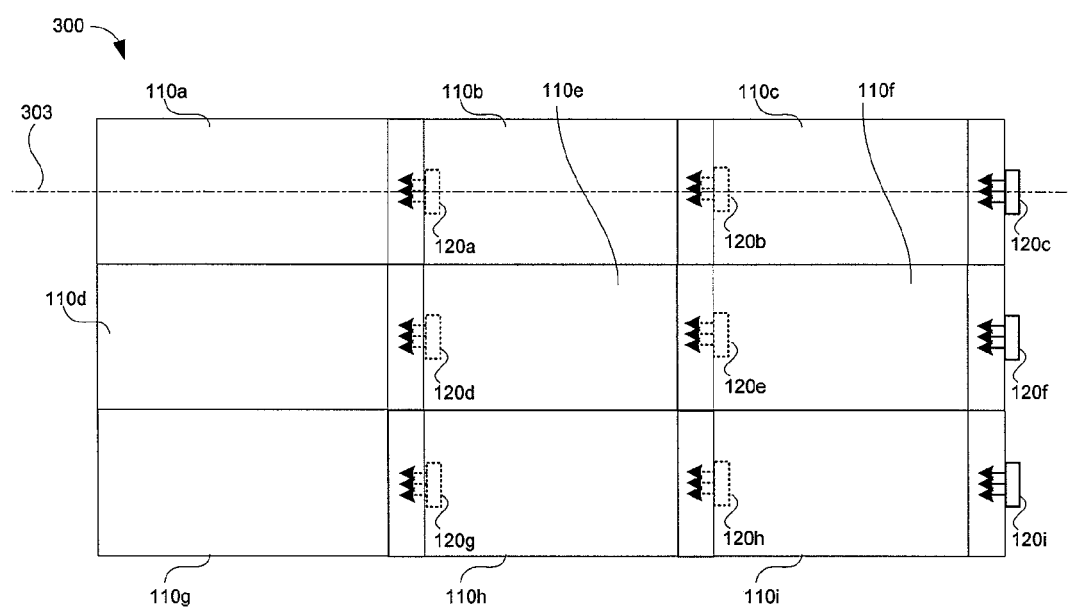

FIGS. 3A-B are cross-section and top views of an illumination assembly including tiles shown in FIGS. 2A-B, in accordance with one embodiment. The view of FIG. 3A is a cross-section along line 303 of FIG. 3B.

Illumination assembly 300 can include a plurality of illumination tiles arranged in a two-dimensional array. Each of the illumination tiles may include a light guide (110a-i) and one or more light-emitting devices (120a-i). For example, the illumination tiles of FIGS. 3A-B may be similar or identical to the illumination tile illustrated in FIGS. 2A-B. As shown in FIG. 3A, the light input portion (e.g., 122a) of one illumination tile may be disposed under the extraction portion (e.g., 124b) of an adjacent illumination tile. As previously described, the light input portion may also serve as a light homogenization region. Although the illustration of FIGS. 3A-B shows a 3×3 illumination tile array, it should be appreciated that any number of tiles may be arranged to form an M×N illumination tile array, wherein M and N are any positive integer.

Figure 4A:
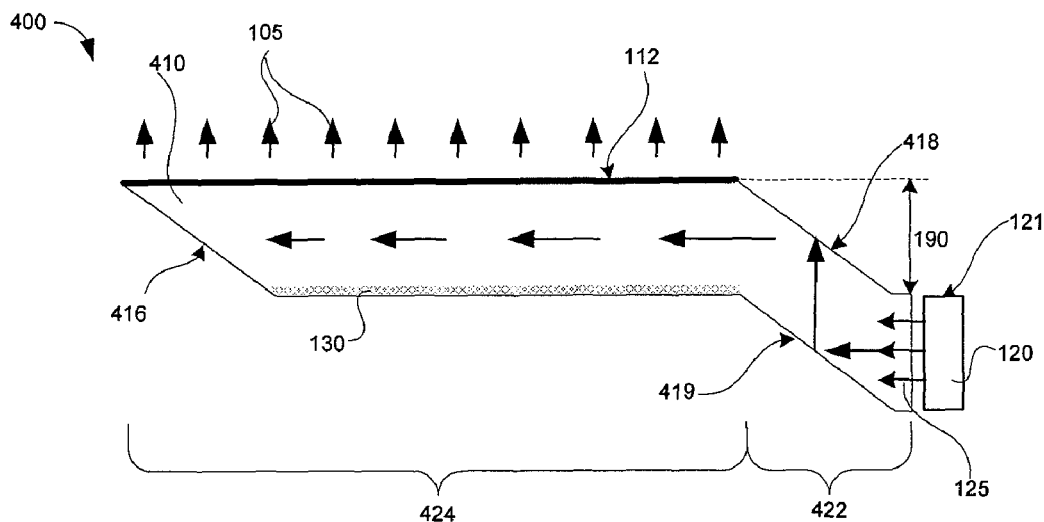
FIGS. 4A-B are cross-section and top views of an illumination tile, in accordance with one embodiment.
Figure 4B:
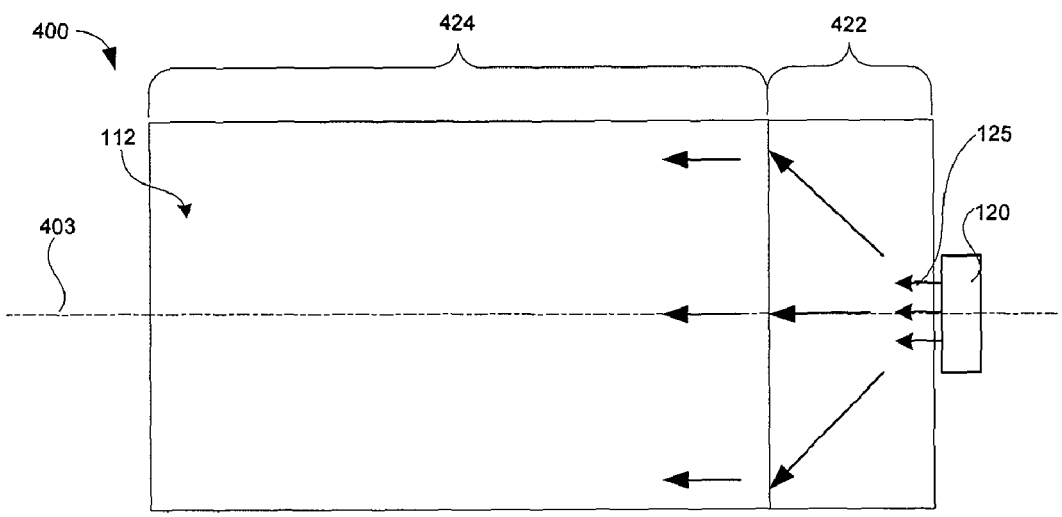

FIGS. 4A-B are cross-section and top views of an illumination tile, in accordance with one embodiment. The view of FIG. 4A is a cross-section along line 403 of FIG. 4B.

Illumination tile 400 is another illumination tile that may be constructed so as to enable the arrangement of a plurality of such tiles in a two-dimensional array having a contiguous emission surface. Light guide 410 can receive light 125 emitted from the light-emitting device 120 via an edge, as illustrated in FIG. 4. As was previously shown for the light guide 110, light guide 410 can include a light extraction portion 424 having top surface 112 that can emit light 105, thereby serving as a light emission surface. Light guide 410 can include a light input portion 422 including an edge that receives light from the light-emitting device 120 and a top surface 418 offset vertically from the top emission surface 112 of the light extraction portion 424. The vertical offset is the maximum vertical distance 190 between the top surface 418 of the light input portion 422 and the top emission surface 112 of the light extraction portion 424. In some embodiments, the vertical offset distance is greater than about 0.1 cm (e.g., greater than about 0.2 cm, greater than about 0.5 cm, greater than about 1 cm, greater than 2 cm). In some embodiments, the vertical offset distance is between about 0.1 cm and about 0.2 cm, between about 0.2 cm and about 0.5 cm, between about 0.5 cm and about 1 cm, or between about 1 cm and about 2 cm, or between about 0.1 cm and 2 cm. The vertical offset can allow a plurality of such light guides to be arranged in a co-planar two-dimensional array configuration thereby forming a contiguous illumination surface.

The illumination tile 400 may be similar to tile 200 in that a first end of the tile (e.g., the leftmost end of the tile 400) has a boundary surface that can fit into the boundary surface defined by a second end of the tile (e.g., the rightmost end of the tile 400). For example, with regards to illumination tile 400, the leftmost portion of the light guide 410 defined by edge 416 can fit into the boundary surface defined by light guide edge 418 and the top edge 121 of light emitting device 120 (and any gap space between the device 120 and light guide 410).

Light input portion 422 may include edges 419 and 418 which may be configured to reflect light from light emitting device 120 up towards light extraction portion 424. In some embodiments, edges 419 and/or 418 may reflect light via total internal reflection. Alternatively, or additionally, edges 419 and/or 418 may reflect light by the use of reflective regions, for example, mirrored regions (e.g., metal layer(s), dielectric and/or semiconductor mirror stacks, omni-directional mirrors). In some embodiments, light input portion 422 may also serve as a light homogenization region. To achieve homogenization, the light input portion 422 may have a sufficiently long length so as to allow light received from the light-emitting device 120 to spread uniformly laterally, as illustrated in FIG. 4B. The spatially homogenized light may be coupled into extraction portion 424.

Figure 5A:
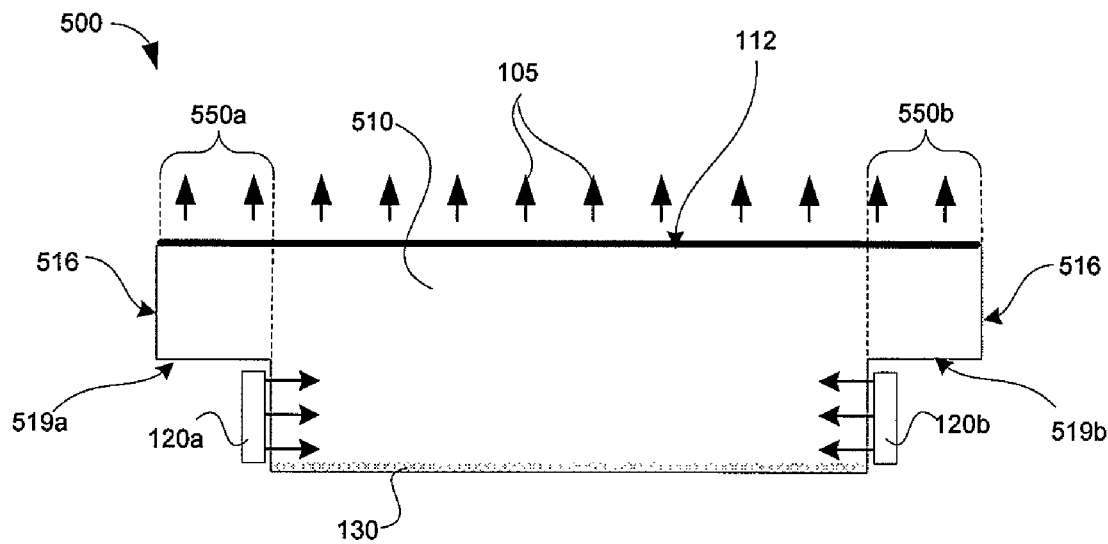
FIGS. 5A-B are cross-section and top views of an illumination tile, in accordance with one embodiment.
Figure 5B:
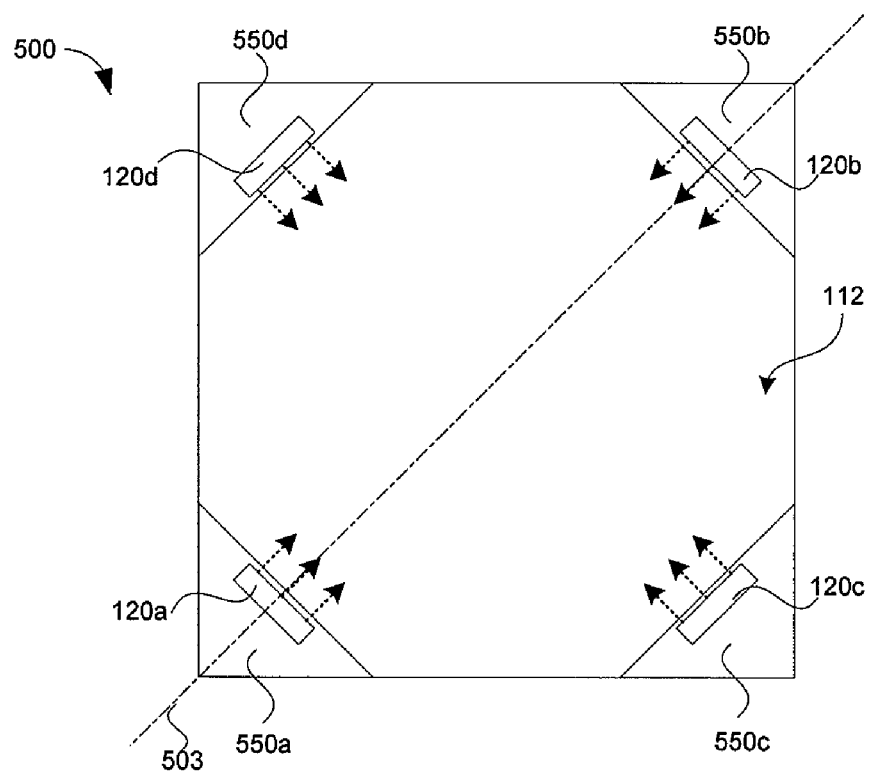

FIGS. 5A-B are cross-section and top views of an illumination tile, in accordance with one embodiment. The view of FIG. 5A is a cross-section along line 503 of FIG. 5B.

Illumination tile 500 can include one or more solid state light-emitting devices 120a-d, such as one or more light-emitting diodes and/or laser diodes. Illumination tile 500 can also include a light guide 510 including one or more edges arranged to receive light from the light-emitting device(s). Light guide 510 can include a top surface 112 arranged to emit light received by the edge(s), thereby serving as light emission surface.

Light guide 510 can include one or more overhang portions 550a-d. Each overhang portion can include a portion of the top surface 112. As illustrated in FIGS. 5A-B, the overhang portions may be located at one or more corners of light guide 510. Alternatively, or additionally, overhangs may be located at any other location along the perimeter of the illumination tile, for example along one or more edges.

Since the overhang portions allow for light-emitting devices to be placed underneath the top emission surface 112, multiple illumination tiles with such overhang portions, such as illumination tile 500, can be arranged in a two-dimensional array so as to provide a substantially contiguous illumination surface comprising the light emission surfaces of the plurality of the illumination tiles. Each illumination tile is thus configured to fit adjacent to another side of the illumination tile.

Illumination tile 500 can be configured such that the light output intensity across the top emission surface 112 is substantially uniform. This may be facilitated via the use of light scattering and/or reflection features 130 which may have a density (e.g., number per unit area or volume) that varies as a function of location. Scattering and/or reflection features 130 may be disposed on the backside (as shown in FIG. 5A), the top surface 112, and/or within the light guide 510.

In some embodiments, one or more edges 516 of light guide 510 may be reflective and may prevent light from one tile from coupling into adjacent tiles. Reflective edges may be formed by coating the surface of an optically transparent light guide with a reflective material, for example, one or more metals (e.g., aluminum, silver, etc.). In some embodiments, the undersides (e.g., 519a, 519b, etc.) of the overhang portions (e.g., 550) may be reflective.

FIGS. 6A-B are cross-section and top views of an illumination tile, in accordance with one embodiment. The view of FIG. 6A is a cross-section along line 603 of FIG. 6B. Illumination tile 600 is similar to illumination tile 500 and includes light guide 610 including one or more overhang portions 650a-d. Overhang portions 650a-d may include edges 616 oriented at a non-perpendicular angle with respect to top emission surface 112. Regions of the edges 616 of the overhang portions that do not receive light from the light-emitting devices can be reflective. Multiple illumination tiles 600 may be used to create a two-dimensional array having a contiguous illumination surface.

Figure 7A:
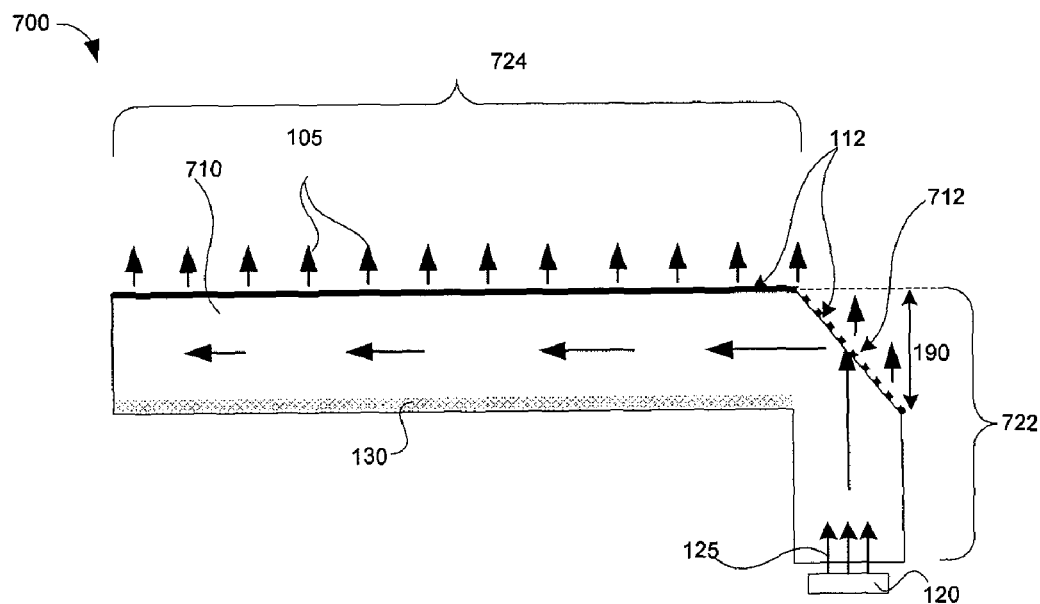
FIGS. 7A-B are cross-section and top views of an illumination tile, in accordance with one embodiment.
Figure 7B:
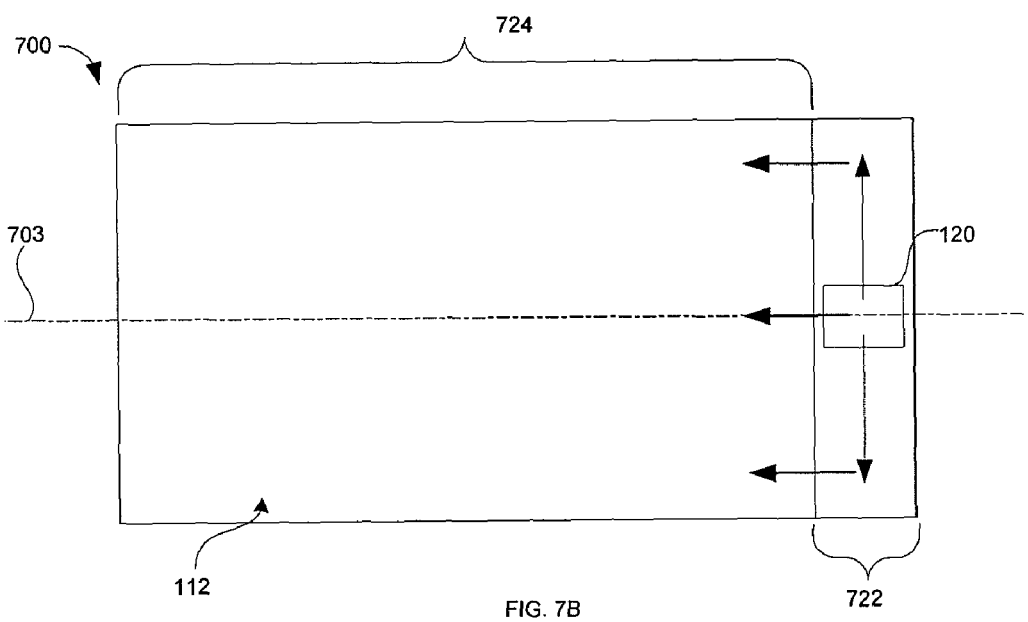

FIGS. 7A-B are cross-section and top views of an illumination tile, in accordance with one embodiment. The view of FIG. 7A is a cross-section along line 703 of FIG. 7B.

Illumination tile 700 can include a light guide 710. Light guide 710 may include a light input portion 722 including an edge that receives light from one or more light-emitting devices 120. The light input portion 722 may redirect a substantial portion of the received light to a light extraction portion 724 of the light guide that can scatter light out via the light emission surface 112. In some embodiments, the light input portion 722 can serve as part or all of a homogenization region that uniformly distributes light laterally, as illustrated in the top view of FIG. 7B.

Light input portion 722 may be oriented at an angle (e.g., not parallel) with respect to light extraction portion 724. For example, as shown in the illustration of FIG. 7A, light input portion 722 may be oriented substantially perpendicular to extraction portion 724. In some embodiments, the orientation angle between extraction portion 724 and input portion 722 may be greater than or equal to about 90 degrees (e.g., greater than or equal to about 115 degrees, greater than or equal to about 135 degrees). Light 125 from light-emitting device 120 may be coupled into an edge of the light input portion 722 and upon (or during) homogenization may be partially (or completely) redirected into extraction portion 724.

Light redirection may be accomplished by a reflective region and/or surface 712 (illustrated by a dashed line) that can redirect a substantial portion (or all) of the light that impinges on the region and/or surface. Reflective region and/or surface 712 may be configured to transmit a portion of the received light. In some embodiments, reflection region and/or surface 712 may include a partially reflective mirror (e.g., a thin metal layer, a dielectric and/or semiconductor stack, an omni-directional mirror). In some embodiments, the light emission surface 112 can include part (or all) of the reflective region and/or surface 712.

In some embodiments, one or more light-emitting devices 120 may be disposed behind the light emission surface 112. In such a configuration, the light emission area of the light-emitting device 120 may be completely under the top emission surface 112. In some embodiments, light may be redirected by at least 25 degrees (e.g., by at least 45 degrees, by at least 90 degrees). In some embodiments, the top emission surface 112 of the light guide 710 may be substantially perpendicular to the propagation direction of light emitted by the light-emitting device 120. In some embodiments, the propagation direction of the redirected light may be substantially parallel to the top emission surface 112 of the light guide 710.

As previously described in the context of other embodiments presented herein, the light output intensity across the top emission surface 112 may be substantially uniform which may in part be facilitated by incorporating light scattering and/or reflecting features 130 with a varying density (e.g., number per unit area or volume) along the length of the light guide. The partial reflectivity (and transmissivity) of reflective region and/or surface 712 may be selected so as provide for the transmission of light that can match the intensity of the light emitted along the light guide.

Although the illustration shows a light homogenization region located before the reflective region 712, it should be appreciated that in some embodiments, the homogenization region may be located after the reflective region 712.

Figure 8:
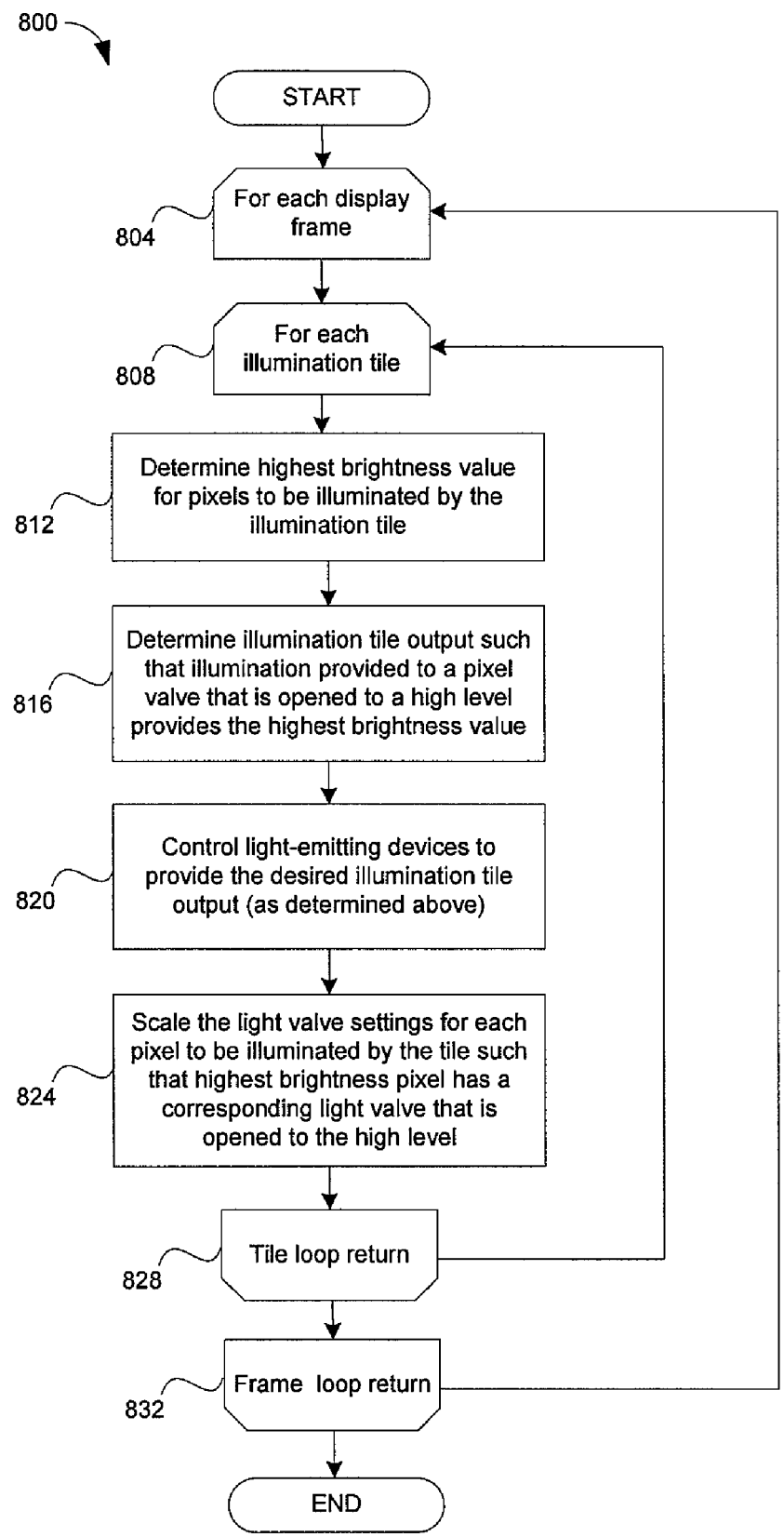
FIG. 8 is a flowchart of a method for locally dimming a tiled illumination assembly, in accordance with one embodiment.

FIG. 8 is a flowchart 800 of a method for locally dimming a tiled illumination assembly, in accordance with one embodiment. The method of flowchart 800 may be performed by a one or more processors and/or control units of a display. The method can be used to control the illumination and provide for local dimming of a display backlight unit, for example a liquid crystal display (LCD) backlight unit. As is known in the art, a LCD includes a liquid crystal layer formed of a plurality of individually addressable pixel light valves. Each pixel light valve can be controlled electronically to transmit anywhere between substantially no light to substantially all the light provided by the backlight unit. As should be appreciated by those in the art, pixels may comprise subpixels of a plurality of primary colors (e.g., red, green, blue).

In some embodiments, the backlight unit includes a plurality of illumination tiles each having a light emission surface. As illustrated in FIGS. 1A-B, the illumination tiles can be arranged in a two-dimensional array defined by a first axis and a second axis with at least two illumination tiles aligned along the first axis and at least two illumination tiles aligned along the second axis. The illumination tiles may be constructed and arranged so as to provide a substantially contiguous illumination surface comprising the light emission surfaces of the plurality of the illumination tiles. The backlight unit can include a plurality of solid state light-emitting devices, wherein each illumination tile can be illuminated by one or more solid state light-emitting devices (e.g., LEDs, laser diodes). In some embodiments, each of the light-emitting devices is arranged to illuminate a single illumination tile. In some embodiments, a single light-emitting device illuminates a single illumination tile. In some embodiments, each pixel light valve of a LCD receives light from a single illumination tile. Thus, in some embodiments, the illumination provided to each pixel light valve can be precisely controlled by controlling the light output of only one illumination tile.

Local dimming of the backlight unit can be performed for every frame that is displayed by the LCD (act 804 of flowchart 800). In act 808, for each illumination tile, the method may include adjusting the light outputted by the tile and the degree to which each pixel light valve illuminated by the tile is opened. In act 812, for each illumination tile of the plurality of illumination tiles, a determination is made as to the highest desired brightness for light to be outputted by the pixel light valves illuminated by the illumination tile. This can be accomplished by a processor and/or control unit that determines the highest desired brightness value based on the video signal input.

A determination can then be made of the illumination tile output that can provide the brightest pixel the desired brightness when the corresponding pixel light valve is open to a high level (act 816). The high level can be a fully open level or a partially open level. Given the high level, the illumination tile output can be calculated based on the relation that the light output from a pixel light valve may be proportional to the illumination tile light output multiplied by the high level for a pixel light valve (e.g., 1 for a fully open level). As such, the desired illumination tile output may be given by the brightest pixel value divided by the high level and times a proportionality constant (e.g., which may have been previously determined and stored as a calibration parameter).

The light-emitting devices that illuminate the tile can then be controlled (e.g., via the supply of electrical power to the devices) such that light output from the light emission surface of the tile provides the desired illumination output (act 820), as determined in act 816. This can be accomplished by using a look-up calibration table to provide a relationship between illumination tile light output versus electrical power supplied to the light-emitting devices. In some embodiments, one or more light sensors (e.g., color sensors, photodiodes) may detect the light output from each illumination tile and the detected light output may be used to control the electrical power supplied to the light-emitting devices. This type of feedback control arrangement may provide the desired illumination light output from each illumination tile irrespective of light-emitting device aging which may alter the light output (versus electrical power) of each light-emitting device.

To adjust the degree to which the light valves are opened based on the illumination tile output, the pixel light valve settings for pixels illuminated by the given illumination tile can then be scaled by a constant such that the highest brightness pixel has a corresponding light valve that is open to the highest level (act 824). Upon the determination of the pixel light valve settings, the pixel light valves can be controlled based on these settings, and the frame can be displayed.

Acts 812-824 can then be repeated for each illumination tile (act 828). Similarly, acts 808-828 can then be repeated for each frame displayed (act 832).

As should be appreciated, when the illumination sources produce white light (e.g., blue or UV light sources with yellow phosphor), the method can be performed for the light outputted by color filters (e.g., red, green, blue color filters) that may be present before each pixel (e.g., red, green, blue sub-pixels). In such a situation, the brightest of the red, green, and blue pixel value settings can be used to determine the dimming level of the white light provided. Alternatively, when a single pixel light valve serves a light valve for different primary colors at different times, as in a color-filterless LCD, the method (or certain acts of the method, such as acts 820 and 824) may be performed separately for each of the plurality of primary colors (e.g., red, green, blue) provided by multiple primary color light-emitting devices (e.g., red, green, blue). When color filters are present and multiple primary color light-emitting devices (e.g., red, green, blue) are present, the method (or certain acts of the method, such as acts 820 and 824) may be performed independently (e.g., simultaneously) for the plurality of primary colors (e.g., red, green, blue) and the different primary color light-emitting devices can be controlled to output different amounts of light.

Figure 9:
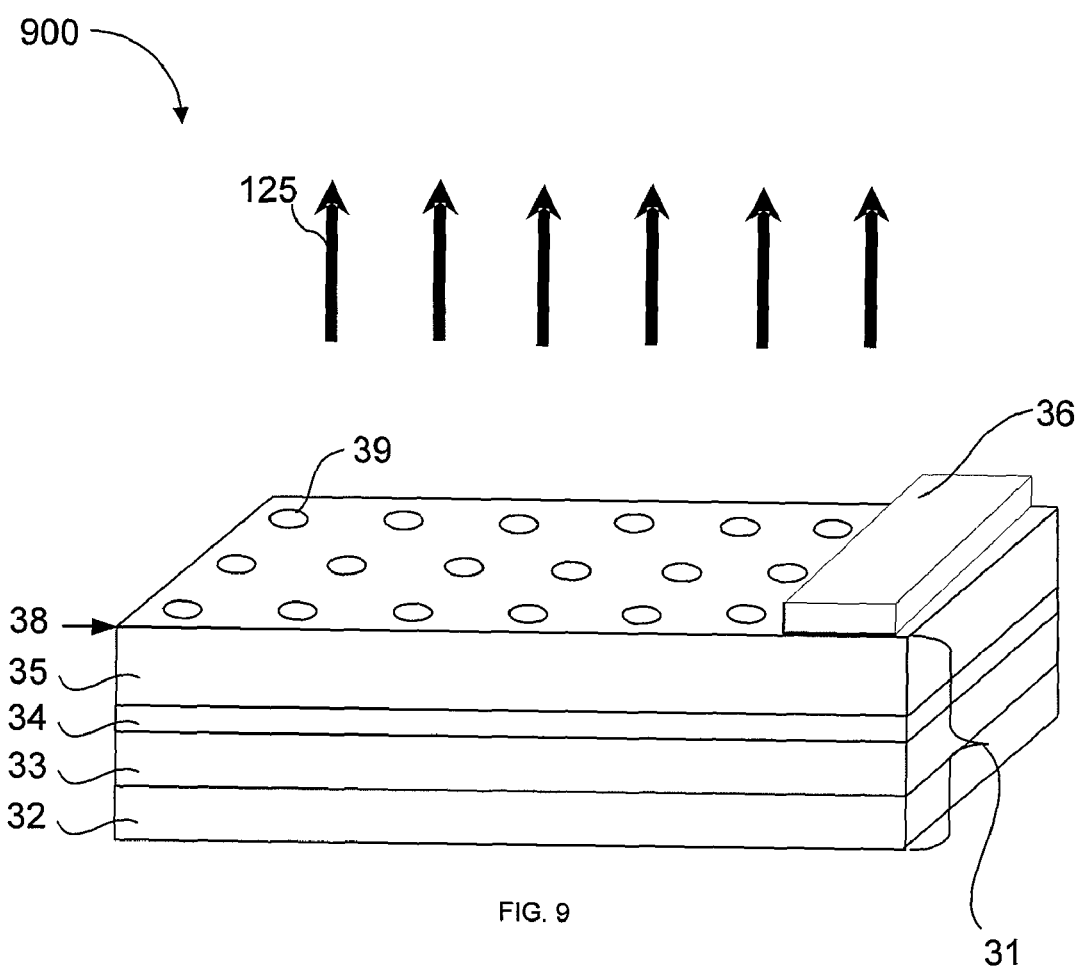
FIG. 9 is a schematic drawing of a light-emitting device, in accordance with one embodiment.

In some embodiments, the solid state light-emitting devices used to illuminate the tiles and/or assemblies presented herein can include a light-emitting diode. FIG. 9 illustrates a light-emitting diode (LED) which may be one example of a light-emitting device, in accordance with one embodiment. It should be understood that various embodiments presented herein can also be applied to other light-emitting devices, such as laser diodes, and LEDs having different structures (such as organic LEDs, also referred to as OLEDs). LED 900 shown in FIG. 9 comprises a multi-layer stack 31 that may be disposed on a support structure (not shown). The multi-layer stack 31 can include an active region 34 which is formed between n-doped layer(s) 35 and p-doped layer(s) 33. The stack can also include an electrically conductive layer 32 which may serve as a p-side contact, which can also serve as an optically reflective layer. An n-side contact pad 36 may be disposed on layer 35. Electrically conductive fingers (not shown) may extend from the contact pad 36 and along the surface 38, thereby allowing for uniform current injection into the LED structure.

It should be appreciated that the LED is not limited to the configuration shown in FIG. 9, for example, the n-doped and p-doped sides may be interchanged so as to form a LED having a p-doped region in contact with the contact pad 36 and an n-doped region in contact with layer 32. As described further below, electrical potential may be applied to the contact pads which can result in light generation within active region 34 and emission (represented by arrows 125) of at least some of the light generated through an emission surface 38. As described further below, holes 39 may be defined in an emission surface to form a pattern that can influence light emission characteristics, such as light extraction and/or light collimation. It should be understood that other modifications can be made to the representative LED structure presented, and that embodiments are not limited in this respect.

The active region of an LED can include one or more quantum wells surrounded by barrier layers. The quantum well structure may be defined by a semiconductor material layer (e.g., in a single quantum well), or more than one semiconductor material layers (e.g., in multiple quantum wells), with a smaller electronic band gap as compared to the barrier layers. Suitable semiconductor material layers for the quantum well structures can include InGaN, AlGaN, GaN and combinations of these layers (e.g., alternating InGaN/GaN layers, where a GaN layer serves as a barrier layer). In general, LEDs can include an active region comprising one or more semiconductors materials, including III-V semiconductors (e.g., GaAs, AlGaAs, AlGaP, GaP, GaAsP, InGaAs, InAs, InP, GaN, InGaN, InGaAlP, AlGaN, as well as combinations and alloys thereof), II-VI semiconductors (e.g., ZnSe, CdSe, ZnCdSe, ZnTe, ZnTeSe, ZnS, ZnSSe, as well as combinations and alloys thereof), and/or other semiconductors. Other light-emitting materials are possible such as quantum dots or organic light-emission layers.

The n-doped layer(s) 35 can include a silicon-doped GaN layer (e.g., having a thickness of about 4000 nm thick) and/or the p-doped layer(s) 33 include a magnesium-doped GaN layer (e.g., having a thickness of about 40 nm thick). The electrically conductive layer 32 may be a silver layer (e.g., having a thickness of about 100 nm), which may also serve as a reflective layer (e.g., that reflects upwards any downward propagating light generated by the active region 34). Furthermore, although not shown, other layers may also be included in the LED; for example, an AlGaN layer may be disposed between the active region 34 and the p-doped layer(s) 33. It should be understood that compositions other than those described herein may also be suitable for the layers of the LED.

As a result of holes 39, the LED can have a dielectric function that varies spatially according to a pattern. Typical hole sizes can be less than about one micron (e.g., less than about 750 nm, less than about 500 nm, less than about 250 nm) and typical nearest neighbor distances between holes can be less than about one micron (e.g., less than about 750 nm, less than about 500 nm, less than about 250 nm). Furthermore, as illustrated in the figure, the holes 39 can be non-concentric.

The dielectric function that varies spatially according to a pattern can influence the extraction efficiency and/or collimation of light emitted by the LED. In some embodiments, a layer of the LED may have a dielectric function that varies spatially according to a pattern. In the illustrative LED 900, the pattern is formed of holes, but it should be appreciated that the variation of the dielectric function at an interface need not necessarily result from holes. Any suitable way of producing a variation in dielectric function according to a pattern may be used. For example, the pattern may be formed by varying the composition of layer 35 and/or emission surface 38. The pattern may be periodic (e.g., having a simple repeat cell, or having a complex repeat super-cell), or non-periodic. As referred to herein, a complex periodic pattern is a pattern that has more than one feature in each unit cell that repeats in a periodic fashion. Examples of complex periodic patterns include honeycomb patterns, honeycomb base patterns, (2×2) base patterns, ring patterns, and Archimedean patterns. In some embodiments, a complex periodic pattern can have certain holes with one diameter and other holes with a smaller diameter. As referred to herein, a non-periodic pattern is a pattern that has no translational symmetry over a unit cell that has a length that is at least 50 times the peak wavelength of light generated by one or more light-generating portions. As used herein, peak wavelength refers to the wavelength having a maximum light intensity, for example, as measured using a spectroradiometer. Examples of non-periodic patterns include aperiodic patterns, quasi-crystalline patterns (e.g., quasi-crystal patterns having 8-fold symmetry), Robinson patterns, and Amman patterns. A non-periodic pattern can also include a detuned pattern (as described in U.S. Pat. No. 6,831,302 by Erchak, et al., which is incorporated herein by reference in its entirety). In some embodiments, a device may include a roughened surface. The surface roughness may have, for example, a root-mean-square (rms) roughness about equal to an average feature size which may be related to the wavelength of the emitted light.

In certain embodiments, an interface of a light-emitting device is patterned with holes which can form a photonic lattice. Suitable LEDs having a dielectric function that varies spatially (e.g., a photonic lattice) have been described in, for example, U.S. Pat. No. 6,831,302 B2, entitled "Light emitting devices with improved extraction efficiency," filed on Nov. 26, 2003, which is herein incorporated by reference in its entirety. A high extraction efficiency for an LED implies a high power of the emitted light and hence high brightness which may be desirable in various optical systems.

It should also be understood that other patterns are also possible, including a pattern that conforms to a transformation of a precursor pattern according to a mathematical function, including, but not limited to an angular displacement transformation. The pattern may also include a portion of a transformed pattern, including, but not limited to, a pattern that conforms to an angular displacement transformation. The pattern can also include regions having patterns that are related to each other by a rotation. A variety of such patterns are described in U.S. Patent Publication No. 20070085098, entitled "Patterned devices and related methods," filed on Mar. 7, 2006, which is herein incorporated by reference in its entirety.

Light may be generated by the LED as follows. The p-side contact layer can be held at a positive potential relative to the n-side contact pad, which causes electrical current to be injected into the LED. As the electrical current passes through the active region, electrons from n-doped layer(s) can combine in the active region with holes from p-doped layer(s), which can cause the active region to generate light. The active region can contain a multitude of point dipole radiation sources that generate light with a spectrum of wavelengths characteristic of the material from which the active region is formed. For InGaN/GaN quantum wells, the spectrum of wavelengths of light generated by the light-generating region can have a peak wavelength of about 445 nanometers (nm) and a full width at half maximum (FWHM) of about 30 nm, which is perceived by human eyes as blue light. The light emitted by the LED may be influenced by any patterned surface through which light passes, whereby the pattern can be arranged so as to influence light extraction and/or collimation.

In other embodiments, the active region can generate light having a peak wavelength corresponding to ultraviolet light (e.g., having a peak wavelength of about 370-390 nm), violet light (e.g., having a peak wavelength of about 390-430 nm), blue light (e.g., having a peak wavelength of about 430-480 nm), cyan light (e.g., having a peak wavelength of about 480-500 nm), green light (e.g., having a peak wavelength of about 500 to 550 nm), yellow-green (e.g., having a peak wavelength of about 550-575 nm), yellow light (e.g., having a peak wavelength of about 575-595 nm), amber light (e.g., having a peak wavelength of about 595-605 nm), orange light (e.g., having a peak wavelength of about 605-620 nm), red light (e.g., having a peak wavelength of about 620-700 nm), and/or infrared light (e.g., having a peak wavelength of about 700-1200 nm).

In certain embodiments, the LED may emit light having a high light output power. As previously described, the high power of emitted light may be a result of a pattern that influences the light extraction efficiency of the LED. For example, the light emitted by the LED may have a total power greater than 0.5 Watts (e.g., greater than 1 Watt, greater than 5 Watts, or greater than 10 Watts). In some embodiments, the light generated has a total power of less than 100 Watts, though this should not be construed as a limitation of all embodiments. The total power of the light emitted from an LED can be measured by using an integrating sphere equipped with spectrometer, for example a SLM12 from Sphere Optics Lab Systems. The desired power depends, in part, on the optical system that the LED is being utilized within. For example, a display system (e.g., a LCD system) may benefit from the incorporation of high brightness LEDs which can reduce the total number of LEDs that are used to illuminate the display system.

The light generated by the LED may also have a high total power flux. As used herein, the term "total power flux" refers to the total optical power divided by the emission area. In some embodiments, the total power flux is greater than 0.03 Watts/mm$^2$, greater than 0.05 Watts/mm$^2$, greater than 0.1 Watts/mm$^2$, or greater than 0.2 Watts/mm$^2$. However, it should be understood that the LEDs used in systems and methods presented herein are not limited to the above-described power and power flux values.

In some embodiments, the LED may be associated with one or more wavelength converting regions. The wavelength converting region(s) may include one or more phosphors and/or quantum dots. The wavelength converting region(s) can absorb light emitted by the light-generating region of the LED and emit light having a different wavelength than that absorbed. In this manner, LEDs can emit light of wavelength(s) (and, thus, color) that may not be readily obtainable from LEDs that do not include wavelength converting regions. In some embodiments, one or more wavelength converting regions may be disposed over (e.g., directly on) the emission surface (e.g., surface 38) of the light-emitting device.

As used herein, an LED may be an LED die, a partially packaged LED die, or a fully packaged LED die. It should be understood that an LED may include two or more LED dies associated with one another, for example a red light-emitting LED die, a green light-emitting LED die, a blue light-emitting LED die, a cyan light-emitting LED die, or a yellow light-emitting LED die. For example, the two or more associated LED dies may be mounted on a common package. The two or more LED dies may be associated such that their respective light emissions may be combined to produce a desired spectral emission. The two or more LED dies may also be electrically associated with one another (e.g., connected to a common ground).

As used herein, when a structure (e.g., layer, region) is referred to as being "on", "over" "overlying" or "supported by" another structure, it can be directly on the structure, or an intervening structure (e.g., layer, region) also may be present. A structure that is "directly on" or "in contact with" another structure means that no intervening structure is present.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An illumination assembly comprising:
   a plurality of illumination tiles, each illumination tile comprising a light guide in which light propagates by total internal reflection, a light emission surface and a plurality of light extracting features varying in number per unit area along the length of the light guide, wherein the plurality of illumination tiles are arranged in a two-dimensional array, the illumination tiles being constructed and arranged so as to provide a substantially contiguous illumination surface comprising the light emission surfaces of each light guide, and each tile optically isolated from the other tiles to prevent light from coupling to each adjacent tile;
   alignment members configured to align the plurality of illumination tiles in the two-dimensional array, wherein the alignment members are physically separate from the illumination tiles; and
   a plurality of solid state light-emitting devices, wherein each illumination tile is illuminated by at least one of the solid state light-emitting devices; and
   wherein the illumination assembly is a backlight for a video display in which each illumination tile outputs light from the emission surface to provide light to a corresponding group of pixel light valves of the video display, an illumination output of each illumination tile independently controlled for local dimming of the video display according to brightness values in a video signal applied to the video display for the corresponding group of pixel light valves and the illumination output updated for each frame of the video signal.

2. The assembly of claim 1, wherein the two-dimensional array is defined by a first axis and a second axis with at least two illumination tiles aligned along the first axis and at least two illumination tiles aligned along the second axis.

3. The assembly of claim 1, wherein each of the light-emitting devices is arranged to illuminate a single illumination tile.

4. The assembly of claim 1, wherein a single light-emitting device illuminates a single illumination tile.

5. The assembly of claim 1, wherein the plurality of illumination tiles are edge-lit by the one or more light-emitting devices.

6. The assembly of claim 1, wherein the plurality of illumination tiles are back-lit by the one or more light-emitting devices.

7. The assembly of claim 1, wherein the solid state light-emitting devices illuminating each illumination tile are disposed under the light emission surface of the illumination tile.

8. The assembly of claim 1, wherein the number of light-emitting devices per unit area of the contiguous illumination surface is less than or equal to 300.

9. The assembly of claim 1, wherein the number of light-emitting devices per illumination tile is less than or equal to 12.

10. The assembly of claim 1, wherein light intensity across each illumination tile is substantially uniform.

11. The assembly of claim 1, wherein the two-dimensional array comprises a two-dimensional rectangular arrangement.

12. The assembly of claim 1, wherein the plurality of illumination tiles comprise wavelength converting material.

13. A method of local dimming of a display backlight unit for a liquid crystal display that has a plurality of pixel light valves, the method comprising:
   (A) providing the display backlight unit comprising a plurality of illumination tiles, each illumination tile comprising a light guide in which light propagates by total internal reflection, a light emission surface and a plurality of light extracting features varying in number per unit area along the length of the light guide, wherein the plurality of illumination tiles are arranged in a two-dimensional array, the display backlight unit further comprising a plurality of solid state light-emitting devices, wherein each illumination tile is illuminated by at least one of the solid state light emitting devices, wherein said light guide includes at least one edge for receiving light emitted by the at least one solid state light-emitting devices, and further comprising alignment members configured to align the plurality of illumination tiles in the two-dimensional array, the alignment members being physically separate from the illumination tiles;
   (B) for each illumination tile of the plurality of illumination tiles, the illumination tile outputs light from the emission surface to provide light for a corresponding group of the pixel light valves of the display and the method further comprising for the corresponding group of pixel light valves determining a highest desired brightness for light to be outputted by the corresponding group of pixel light valves illuminated by the illumination tile;
   (C) controlling light emission from the one or more light-emitting devices such that light output from the light emission surface of each illumination tile provides a light input to the corresponding group of pixel light valves at a desired level of transmission such that the light output by the pixel light valve with the highest desired brightness has the highest desired brightness; and
   (D) repeating (B) and (C) for each frame of a video signal applied to the display.

14. The method of claim 13, wherein the two-dimensional array is defined by a first axis and a second axis with at least two illumination tiles aligned along the first axis and at least two illumination tiles aligned along the second axis.

15. The method of claim 13, wherein the illumination tiles are constructed and arranged so as to provide a substantially contiguous illumination surface comprising the light emission surfaces of the plurality of the illumination tiles.

16. The method of claim 13, wherein each of the light-emitting devices is arranged to illuminate a single illumination tile.

17. The method of claim 13, wherein a single light-emitting device illuminates a single illumination tile.

18. The method of claim 13, wherein (C) is performed separately for a plurality of colors.

19. The method of claim 13, wherein (C) is performed simultaneously for a plurality of colors.

20. The method of claim 13, wherein the light-emitting devices comprise light-emitting diodes.

21. The illumination assembly of claim 1, wherein each pixel light valve receives light only from a single illumination tile so that illumination of each pixel light valve is precisely controlled by control of light output from the corresponding illumination tile.

22. The method of claim 13, wherein each pixel light valve receives light only from a single illumination tile so that illumination of each pixel light valve is precisely controlled by control of light output from the corresponding illumination tile.

* * * * *